United States Patent
Wesenberg

(10) Patent No.: US 11,352,051 B2
(45) Date of Patent: Jun. 7, 2022

(54) METHOD FOR OPERATING A STEERING SYSTEM FOR A MOTOR VEHICLE AS WELL AS A CORRESPONDING STEERING SYSTEM

(71) Applicant: AUDI AG, Ingolstadt (DE)

(72) Inventor: André Wesenberg, Pfaffenhofen (DE)

(73) Assignee: AUDI AG, Ingolstadt (DE)

( * ) Notice: Subject to any disclaimer, the term of this patent is extended or adjusted under 35 U.S.C. 154(b) by 372 days.

(21) Appl. No.: 16/668,493

(22) Filed: Oct. 30, 2019

(65) Prior Publication Data
US 2020/0130731 A1    Apr. 30, 2020

(30) Foreign Application Priority Data
Oct. 30, 2018   (DE) .......................... 102018218587.5

(51) Int. Cl.
| | |
|---|---|
| *B62D 5/04* | (2006.01) |
| *B60N 2/00* | (2006.01) |
| *B60R 25/021* | (2013.01) |
| *B62D 5/09* | (2006.01) |
| *B62D 5/00* | (2006.01) |

(52) U.S. Cl.
CPC .......... *B62D 5/0481* (2013.01); *B60N 2/002* (2013.01); *B60R 25/021* (2013.01); *B62D 5/001* (2013.01); *B62D 5/046* (2013.01); *B62D 5/091* (2013.01); *B62D 5/092* (2013.01)

(58) Field of Classification Search
None
See application file for complete search history.

(56) References Cited

U.S. PATENT DOCUMENTS

| | | | |
|---|---|---|---|
| 4,956,590 A | * | 9/1990 | Phillips .................. B62D 5/008 318/489 |
| 6,896,090 B2 | * | 5/2005 | Kanda .................... B62D 6/008 180/443 |
| 6,906,492 B2 | * | 6/2005 | Matsushita ............... H02P 6/08 318/434 |

(Continued)

FOREIGN PATENT DOCUMENTS

| | | |
|---|---|---|
| CN | 102917940 A | 2/2013 |
| CN | 104508973 A | 4/2015 |

(Continued)

OTHER PUBLICATIONS

Office Action dated Nov. 17, 2021, in connection with corresponding Chinese Application No. 201911048682.2 (16 pp., including machine-generated English translation).

*Primary Examiner* — Kevin R Steckbauer
(74) *Attorney, Agent, or Firm* — Maier & Maier, PLLC

(57) ABSTRACT

A method for operating a steering system for a motor vehicle, wherein the steering system has at least one steering lever and at least one electric motor for shifting the steering lever so as to cause a steering movement in the presence of a steering input, and wherein the electric motor is electrically connected to a current source via cabling. In doing so, it is provided that the electric motor is actuated and an electric current flowing between the current source and the electric motor is measured in order to check an electrical connection between the current source and the electric motor under the condition that there is no steering input present.

15 Claims, 1 Drawing Sheet

(56) References Cited

U.S. PATENT DOCUMENTS

| | | | |
|---|---|---|---|
| 6,995,567 B2* | 2/2006 | Kawashima | B62D 5/0487 318/293 |
| 7,493,984 B2* | 2/2009 | Ono | B62D 5/008 180/404 |
| 8,055,410 B2* | 11/2011 | Sakamaki | H02P 29/032 701/41 |
| 8,169,168 B2* | 5/2012 | Nagase | B62D 5/0481 180/443 |
| 8,436,568 B2* | 5/2013 | Mukai | B62D 5/0481 318/434 |
| 8,825,299 B2* | 9/2014 | Iwamoto | G05B 11/01 701/76 |
| 8,869,930 B2* | 10/2014 | Ishihara | B62D 15/0215 701/43 |
| 8,909,429 B2* | 12/2014 | Hayama | B62D 6/00 701/43 |
| 8,981,704 B2* | 3/2015 | Endo | B62D 5/0409 318/490 |
| 9,043,091 B2* | 5/2015 | Hayama | B62D 6/00 701/29.2 |
| 9,421,998 B2* | 8/2016 | Yoo | B62D 5/046 |
| 9,701,338 B2* | 7/2017 | Tsubaki | B62D 6/02 |
| 10,103,657 B2* | 10/2018 | Kuwahara | B62D 5/0463 |
| 10,252,745 B2* | 4/2019 | Nampei | B62D 5/049 |
| 10,583,856 B2* | 3/2020 | Miyashita | B62D 5/0481 |
| 10,589,778 B2* | 3/2020 | Siddiqui | B60W 30/18172 |
| 10,673,371 B2* | 6/2020 | Hayakawa | H02P 29/032 |
| 11,052,940 B1* | 7/2021 | Narasimhan | B62D 6/008 |
| 11,167,793 B2* | 11/2021 | Hong | B62D 6/008 |
| 2004/0060764 A1* | 4/2004 | Kanda | B62D 6/008 180/402 |
| 2005/0088126 A1* | 4/2005 | Kawashima | B62D 5/0487 318/434 |
| 2006/0131096 A1* | 6/2006 | Ono | B62D 5/008 180/400 |
| 2009/0043453 A1* | 2/2009 | Sakamaki | B62D 5/0487 701/42 |
| 2009/0069980 A1* | 3/2009 | Sakamaki | B62D 5/0463 701/42 |
| 2010/0264857 A1* | 10/2010 | Nagase | B62D 5/0484 318/139 |
| 2013/0066523 A1* | 3/2013 | Iwamoto | B62D 15/027 701/41 |
| 2013/0138300 A1* | 5/2013 | Hayama | B62D 5/046 701/43 |
| 2013/0144493 A1* | 6/2013 | Hayama | B62D 5/001 701/43 |
| 2013/0218418 A1* | 8/2013 | Ishihara | B62D 5/049 701/43 |
| 2013/0299271 A1* | 11/2013 | Endo | B62D 5/046 180/446 |
| 2015/0151785 A1* | 6/2015 | Yoo | B62D 5/0487 701/41 |
| 2016/0028336 A1* | 1/2016 | Oyama | H02P 29/032 318/564 |
| 2016/0318548 A1* | 11/2016 | Tsubaki | B62D 6/06 |
| 2018/0093702 A1* | 4/2018 | Nampei | B62D 5/0487 |
| 2018/0208235 A1* | 7/2018 | Miyashita | B62D 5/0481 |
| 2018/0234039 A1* | 8/2018 | Kuwahara | B62D 5/0463 |
| 2019/0084614 A1* | 3/2019 | Klein | B62D 6/002 |
| 2019/0097565 A1* | 3/2019 | Hayakawa | H02P 6/085 |
| 2019/0217884 A1* | 7/2019 | Siddiqui | B62D 5/0481 |
| 2019/0367084 A1* | 12/2019 | Hong | B62D 6/008 |
| 2020/0130731 A1* | 4/2020 | Wesenberg | B60R 25/021 |
| 2020/0130733 A1* | 4/2020 | Hwang | B62D 5/005 |
| 2020/0247464 A1* | 8/2020 | Koikegami | H02M 7/537 |
| 2020/0307675 A1* | 10/2020 | Yamashita | B62D 5/046 |
| 2021/0009198 A1* | 1/2021 | Suzuki | B62D 5/0421 |
| 2021/0179166 A1* | 6/2021 | Bergmann | B62D 1/04 |
| 2021/0371008 A1* | 12/2021 | Hwang | B62D 5/0421 |

FOREIGN PATENT DOCUMENTS

| | | | |
|---|---|---|---|
| CN | 104678298 A | | 6/2015 |
| CN | 107922000 A | | 4/2018 |
| GB | 2382553 A | * 6/2003 | ........... B62D 15/029 |
| JP | 2006149146 A | * 6/2006 | ............ B62D 5/046 |
| JP | 2006149146 A | | 6/2006 |

* cited by examiner

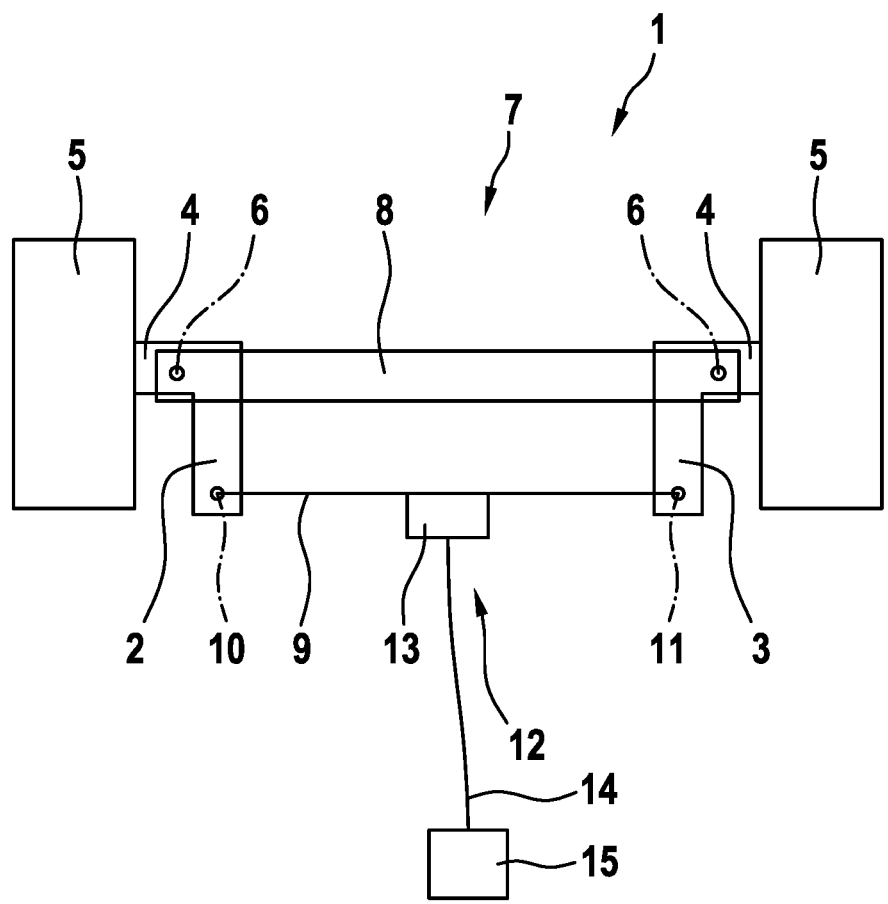

METHOD FOR OPERATING A STEERING SYSTEM FOR A MOTOR VEHICLE AS WELL AS A CORRESPONDING STEERING SYSTEM

FIELD

The disclosure relates to a method for operating a steering system for a motor vehicle, wherein the steering system has at least one steering lever and at least one electric motor for shifting the steering lever so as to cause a steering movement in the presence of a steering input, and wherein the electric motor is electrically connected to a current source via cabling. The invention further relates to a steering system for a motor vehicle.

BACKGROUND

Publication U.S. Pat. No. 6,995,567 B2, for example, is known from the prior art. It relates to a fault detection system for an electric steering system. The fault detection system determines AN faults of one of a first to a fourth switch element of an H-bridge circuit of the electric steering system. The fault detection system determines the AN fault by measuring the value of the current strength and the fluctuation in the value of the current strength. The fault detection system can hereby even detect AN faults when the value of the current strength is within a normal range.

SUMMARY

The object of the invention is to propose a method for operating a steering system for a motor vehicle that has advantages as compared to known methods, particularly that enables high availability of the steering system and reliable fault detection.

In doing so, it is provided that the electric motor is actuated and an electric current flowing between the current source and the electric motor is measured in order to check an electrical connection between the current source and the electric motor under the condition that there is no steering input present, wherein the electric motor is actuated to generate or receive reactive current such that the steering movement stops, and/or the electric motor is actuated for shifting the steering lever, wherein the actuation takes place when the vehicle is stopped or with a steering lever set by means of a locking mechanism.

The steering system is used to steer the motor vehicle, that is to steer the at least one wheel of the motor vehicle, preferably several wheels assigned to the same wheel axle of the motor vehicle. To the extent that solely one wheel is addressed within the scope of this description, the embodiments can always be transferred to the number of wheels and/or each of the several wheels. The steering of the wheel takes place via at least one steering lever. The steering lever engages, for example, one wheel carrier, on which the wheel, in turn, is rotatably mounted. The steering lever may be formed from a steering arm or engage the wheel carrier separately from such a steering arm.

If there are severable steerable wheels, each of the wheels is rotatably mounted on its own wheel carrier. The wheel carriers are arranged apart from one another and rotatably mounted on a body of the motor vehicle, that is about axes of rotation arranged apart from one another. A steering lever engages each of the wheel carriers, preferably in the form of a steering arm. Preferably, the steering arms are connected to one another via a tie rod, wherein the tie rod may be designed as one piece or multiple pieces.

A drive of the steering system engages the steering lever, for example directly or only indirectly, particularly via the tie rod. For example, the drive engages the tie rod directly and engages the steering lever and/or the steering arm by means of said tie rod. A steering movement of the wheel or the wheels can be effected with the assistance of the drive. The steering system is in the form of an electric steering system such that the drive has at least one electric motor. Due to corresponding actuation of the electric motor, a certain steering angle for the motor vehicle is set with the assistance of the steering system. Finally, when there is a steering input, the steering lever is shifted such that a steering movement is effected.

The steering input, for example, is to be understood as the input of a steering angle, particularly of a modified steering angle, by a driver of the motor vehicle and/or a driver assistance apparatus of the motor vehicle. Thus, if the steering angle set within the scope of the steering input deviates from the current steering angle, the current steering angle is modified with the assistance of the drive due to the action of the steering movement in the direction of the defined steering angle, particularly is set thereto. To this end, the drive and/or the electric motor is effectively connected to the steering lever such that a rotational movement of the electric motor is converted into a rotational movement of the steering lever, which, in turn, effects the steering movement.

Electrical energy is required to operate the electric motor. For this reason, the drive and/or the electric motor is electrically connected to the current source, namely via cabling. The electrical energy is thus provided by the current source for operating the electric motor via cabling. For example, the drive is electrically connected to a control unit via the cabling and via said control unit is electrically connected to the current source. The control unit is used to actuate the drive. To this end, the steering input is preferably set on the control unit, upon which the control unit sets the drive such that the steering input is fulfilled, i.e. the actual steering angle matches the steering input and/or the set steering angle after the steering movement.

In addition to the drive and/or the electric motor, the steering system may have at least one control electronics element for the drive and/or the electric motor. The control electronics element, for example, may be in the form of an inverter and/or an end stage for the electric motor. In other words, the electric motor is connected to the cabling and via said cabling to the current source, especially preferably via the control unit, via the at least one control electronics element. The inverter is particularly provided in the event that the electric motor is designed as an alternating current motor and/or as a three-phase motor. Especially preferably, the electric motor is formed as a synchronous motor, particularly as a permanent-magnet synchronous motor. A design of the electric motor as a direct-current motor, however, may also be implemented.

Primarily for an automatic lateral control of the motor vehicle, particularly in the course of a partially autonomous or even fully autonomous driving mode of the motor vehicle, it must be assured that the drive can be operated as intended to implement the steering movement. To this end, it is necessary to check the electrical connection between the current source and the drive to detect, for example, a defect in the cabling. The checking of the electrical connection is preferably implemented before a switchover from a manual driving mode to the automatic lateral control and/or the autonomous driving mode.

For the checking, it is necessary that the cabling has electric current applied. The checking can best be implemented with a defined synthetic current profile, which normally does not occur upon the shifting of the steering lever to implement the steering input. Typical steering systems cannot transfer any electric current via the cabling without converting the corresponding electric power to a moment and thus a steering movement by means of the electric motor. The generation of electric power in the cabling in order to check the electrical connection would thus always result in a steering movement or at least in a fluctuation in an actuating moment of a control element, for example of a steering wheel, which is coupled to the steering lever mechanically. Thus, this results in faults in the driving behavior or the steering haptics.

This can be prevented in that the checking of the electrical connection takes place such that no actuating force is generated, or in a timeframe in which a steering movement does not impact a driving operation of the motor vehicle or a driver of the motor vehicle does not notice such a steering movement. Thus, the checking takes place such that the driving operation of the motor vehicle as well as the steering haptics are not impacted or only slightly impacted in any case.

The checking of the electrical connection is only implemented in the event that no steering input is present, i.e. no steering movement is requested by a driver of the motor vehicle and/or a driver assistance apparatus. If this condition is fulfilled, the checking of the electrical connection can take place in different ways. For example, it is provided to actuate the electric motor in order to generate or receive the reactive current such that the steering movement stops. Additionally or alternatively, it is provided to actuate the electric motor in order to shift the steering lever. This actuation takes place when the motor vehicle is stopped and/or with a steering lever set by means of the locking mechanism.

In the event of actuation of the electric motor in order to generate or receive the reactive current, the electric motor is designed as an alternating current motor or as a three-phase motor. Especially preferably, the electric motor is formed as a synchronous motor, particularly as a permanent-magnet synchronous motor.

Reactive current is understood to be a current that effects no torque and/or no actuating force onto the steering lever. The reactive current may also be characterized as d-current, which is to be differentiated from a torque-forming current, which is also characterized as q-current. The reactive current is ahead of the torque-forming current, for example, by 90°.

In the case of a permanent-magnet electric motor, particularly of the permanent-magnet synchronous motor, the reactive current weakens the magnetic fields of the permanent magnets installed in the electric motor. Because the reactive current does not effect any steering movement but is still transferred, however, via the cabling, it can be especially advantageously used to check the electrical connection. To this end, the electric motor is actuated such that it generates or accepts reactive current, wherein the steering movement is stopped simultaneously. Electric current is hereby transferred between the current source and electric motor, namely via the electrical connection. By measuring the transferred electric current, for example the current strength, a conclusion can be made about the state of the electrical connection, i.e. whether it is functional or not.

Additionally or alternatively, it may be provided to actuate the electric motor, wherein the actuation is directed toward shifting the steering lever. This actuation can take place when the motor vehicle is stopped. In this case, the occurrence of a steering movement is readily acceptable due to the shifting of the steering lever by means of the electric motor, because a driving operation of the motor vehicle is not affected. Additionally or alternatively, the actuation of the electric motor may occur when the steering lever is set by means of the locking mechanism. The locking mechanism, for example, is a steering wheel lock and/or part of an immobilizer. Significant is only that the locking mechanism counteracts or at least can counteract the shifting of the steering lever, at least partially.

For example, the locking mechanism limits a shifting of the steering lever in at least one direction or in opposite directions. In any case, the locking mechanism represents at least one end stop for the steering lever. It can then be provided to actuate the electric motor in order to shift the steering lever such that the steering lever makes contact with the end stop or one of the end stops. For example, it is initially provided to actuate the electric motor such that the steering lever makes contact with one of the end stops such that a further shifting of the steering lever is prevented. Only subsequently is the electric motor actuated in order to check the electrical connection for shifting the steering lever, wherein, in actuality, no further shifting takes place due to the presence of the steering lever at the end stop.

The described procedures have the advantage that a reliable checking of the state of the electrical connection between the current source and the electric motor can be implemented in an especially simple form and manner. The checking additionally takes place such that a driving operation of the motor vehicle is not impacted, for example, in that the checking is implemented before the start or after the end of the driving operation or in that the checking takes place during the driving operation such that no steering movement is caused by the check.

A further embodiment of the invention provides that an alternating current motor or a three-phase motor is used as the electric motor. The use of such a motor has the advantage of a very high power density, that is high power with low weight and/or low volume of the electric motor.

A further embodiment of the invention provides that the actuation to generate or receive the reactive current takes place by applying a direct-current or at least a direct-current portion to the electric motor. One or more windings of the electric motor are impacted with the direct-current and/or the direct-current portion. This takes place such that a rotational movement of the electric motor is completely or nearly completely stopped such that, in the end, no steering movement is implemented. The applying of the direct-current and/or the direct-current portion to the electric motor is technically simple to implement, for example, by means of a corresponding actuation of the control electronics connected to the electric motor.

A preferred further embodiment of the invention provides that the actuation takes place when the vehicle is stopped when it is determined that a driver of the motor vehicle is not in a driver's seat of the motor vehicle and/or in an interior of the motor vehicle, and/or upon unlocking of at least one door of the motor vehicle or upon actuation of an ignition lock from a locked setting. In any case, the actuation should take place before or after the driving operation of the motor vehicle. To this end, a check is made, for example, to determine whether the driver of the motor vehicle is in the driver's seat and/or in the interior of the motor vehicle. The actuation is then only implemented when the driver is not in the driver's seat or not even in the interior of the motor vehicle. In contrast, if it is determined that the driver of the motor vehicle is in the driver's seat and/or in the interior, the actuation is stopped or at least delayed, namely preferably until the aforementioned conditions are fulfilled.

Additionally or alternatively, the actuation then takes place when the door of the motor vehicle is unlocked. In this case, it can be assumed that the driver is not in the driver's seat of the motor vehicle and also not in the interior of the motor vehicle. Alternatively, the actuation is implemented when the ignition lock is shifted out of the locked setting due to a corresponding actuation. The locked setting in this case should be understood as a setting of the ignition lock in which a main drive unit of the motor vehicle, for example an internal combustion engine or an electric motor, is not receiving electrical energy. Preferably, the locked setting corresponds to a setting in which the steering lever is set by means of the locking mechanism. The locking mechanism is preferably, for example, in the form of a steering wheel lock and/or a steering wheel immobilizer.

A further preferred embodiment of the invention provides that the electric motor is actuated such that it effects an actuating force on the steering lever, wherein the actuating force is less than a static friction force between at least one substrate of the motor vehicle and a wheel of the motor vehicle, said wheel being arranged on the substrate and steerable by means of the steering lever. The actuating force applied to the steering lever with the assistance of the electric motor is thus limited to the static friction force, from the exceeding of which a shifting of the wheel on the substrate and the steering movement as well would occur. The static friction force describes the force that must be exerted at least on the steering lever when the vehicle is stopped in order to achieve the steering movement. If the actuating force is less than or equal to the static friction force, the friction present between the wheel and the substrate means that the steering movement does not occur. With such a procedure, the undesirable steering movement is prevented and the checking of the electrical connection is still reliably enabled.

A further embodiment of the invention provides that a position of the steering lever is determined during the actuation, and the actuating force is reduced in the event of a change in the position. Basically, the movement of the steering lever and the resulting steering movement should be prevented. To this end, a check is made during the actuation to determine whether the position is changed. If this is the case, the actuating force generated by means of the electric motor is reduced. Otherwise, it is maintained at a constant or even increased, preferably until the change in position takes place. It may thus be provided to adjust the actuating force in a controlling and/or regulating manner during the check such that it is as great as possible but that no change in the position of the steering lever occurs. The electric current flowing between the current source and the electric motor is hereby maximized such that the checking can be implemented especially reliably and effectively.

A further embodiment of the invention provides that the actuation only occurs with a steering lever set by means of the locking mechanism. The undesirable shifting of the steering lever and the resulting steering movement are hereby reliably prevented during the check of the electrical connection.

A refinement of the invention provides that the locking mechanism for setting the steering lever is set before the actuation. Before the checking is implemented, it should be assured that the shifting of the steering lever is stopped during the check. For this reason, the locking mechanism is adjusted to set the steering lever. Additionally or alternatively, it may be provided to actuate the electric motor such that the steering lever is pushed against the previously described end stop. A steering movement may occur in this case. In contrast, such a steering movement is stopped during the subsequently implemented check.

It may be provided, for example, that the actuation of the electric motor occurring before the check in order to move the steering lever against the end stop of the electric motor is effected with less power than during the check. This means that the steering movement before the check takes place at a comparatively low speed for which only low power is required. During the check on the other hand, a significantly higher power is used, because the steering lever is set by means of the locking mechanism. This reliably prevents an unexpected rapid steering movement before or during the check.

Finally, within the scope of a further embodiment of the invention, it may be provided that the locking mechanism provides an end stop for the steering lever, against which the steering lever is pushed during the actuation of the electric motor. Reference has previously been made thereto. The end stop reliably prevents a shifting of the steering lever and the steering movement at the same time.

The invention further relates to a steering system for a motor vehicle, particularly for implementing the method according to the previous statements, wherein the steering system has at least one steering lever and at least one electric motor for shifting the steering lever so as to cause a steering movement in the presence of a steering input, and wherein the electric motor is electrically connected to a current source via cabling. In doing so, it is provided that the steering system is formed in order to check an electrical connection between the current source and the electric motor under the condition that there is no steering input present, wherein the electric motor is actuated to generate or receive reactive current such that the steering movement stops, and/or the electric motor is actuated for shifting the steering lever, wherein the actuation takes place when the vehicle is stopped or with a steering lever set by means of a locking mechanism.

Reference has already been made to the advantages of such an embodiment of the steering system and/or such procedure. Both the steering system as well as the method for the operation thereof may be further refined according to the statements within the scope of this description, to the extent that reference is made to them.

Of course, the invention also relates to a method for operating a motor vehicle having a steering system, which is operated according to the present description.

BRIEF DESCRIPTION OF THE DRAWINGS

The invention is explained in more detail in the following by means of exemplary embodiments, without limiting the invention. In doing so, the only FIG. 1 shows a schematic representation of a steering system for a motor vehicle.

DETAILED DESCRIPTION

FIG. 1 shows a schematic representation of a part of a steering system 1, which can be used, for example, for a motor vehicle. The steering system 1 has two steering levers, 2 and 3, which are each effectively connected to a wheel carrier 4, particularly rigidly connected. A wheel 5 of the motor vehicle is rotatably mounted on each of the wheel carriers 4. The wheel carriers 4 are each rotatably mounted about an axis of rotation 6 on a part of a body 7 of the motor vehicle, for example on a crossmember 8.

In the exemplary embodiment shown here, the steering levers, 2 and 3, which are in the form of steering arms, are connected to one another via a tie rod 9. The tie rod 9 is rotatably mounted about an axis of rotation, 10 and/or 11, on each of the steering levers, 2 and 3. The axis of rotation, 10 and/or 11, is arranged some distance from respective axis of rotation 6 in this case such that a displacement of the tie rod 9, particularly a linear displacement of the tie rod 9, effects a rotational movement of the wheel carriers 4 about respective axis of rotation 6.

In the exemplary embodiment shown here, the steering system 1 has a drive 12, which has at least one electric motor 13. The electric motor 13 is coupled to the tie rod 9. The electric motor 13 engages the tie rod 9 directly in this respect. The drive 12 is electrically connected to a current source 15 via cabling 14. In order to check the electrical connection between the drive 12 and the current source 15, it is then provided to actuate the drive 12. The actuation takes place only under the condition that there is no steering input present. Actuation of the electric motor 13 takes place such that it generates or accepts a reactive current, wherein the steering movement is stopped. Additionally or alternatively, the electric motor 13 is actuated for shifting the steering lever, 2 or 3, wherein the actuation takes place when the vehicle is stopped and/or with a steering lever, 2 or 3, set by means of a locking mechanism.

During the actuation of the drive 12, an electric current flowing between the current source 15 and the drive 12 is measured. By means of the measured current, for example by means of the current strength of the electric current, a conclusion is subsequently made about the functionality of the steering system 1 and/or a proper state of the electrical connection.

The invention claimed is:

1. A method for operating a steering system for a motor vehicle, wherein the steering system has at least one steering lever and at least one electric motor for shifting the at least one steering lever so as to cause a steering movement based on a steering input, the at least one electric motor is electrically connected to a current source via cabling, the method comprising:
   actuating the at least one electric motor;
   measuring an electric current flowing between the current source and the at least one electric motor to check an electrical connection between the current source and the at least one electric motor;
   determining a position of the at least one steering lever during the actuation of the at least one electric motor; and
   reducing an actuating force of the at least one electric motor after a change in the position of the at least one steering lever.

2. The method according to claim 1, wherein an alternating current motor or a three-phase motor is used as the at least one electric motor.

3. The method according to claim 1, wherein the actuation of the at least one electric motor further comprises:
   applying a direct-current to the at least one electric motor.

4. The method according to claim 1, wherein the actuation of the at least one electric motor takes place when the motor vehicle is stopped, when a driver of the motor vehicle is not in a driver's seat of the motor vehicle, at least one door of the motor vehicle is unlocked, or upon actuation of an ignition lock from a locked setting.

5. The method according to claim 1, wherein the at least one electric motor is actuated such that the actuating force of the at least one electric motor is less than a static friction force between at least one substrate of the motor vehicle and a wheel of the motor vehicle, said wheel being arranged on the at least one substrate and steerable by means of the at least one steering lever.

6. The method according to claim 1, further comprising:
   setting a locking mechanism of the at least one steering lever before the actuation of the at least one electric motor.

7. The method according to claim 1, wherein a locking mechanism provides an end stop for the at least one steering lever, against which the at least one steering lever is pushed due to the actuation of the at least one electric motor.

8. The method according to claim 2, wherein the actuation of the at least one electric motor further comprises:
   applying a direct-current to the at least one electric motor.

9. The method according to claim 2, wherein the actuation of the at least one electric motor takes place when the motor vehicle is stopped, when a driver of the motor vehicle is not in a driver's seat of the motor vehicle, at least one door of the motor vehicle is unlocked, or upon actuation of an ignition lock from a locked setting.

10. The method according to claim 3, wherein the actuation of the at least one electric motor takes place when the motor vehicle is stopped, when a driver of the motor vehicle is not in a driver's seat of the motor vehicle, at least one door of the motor vehicle is unlocked, or upon actuation of an ignition lock from a locked setting.

11. The method according to claim 2, wherein the at least one electric motor is actuated such that the actuating force of the at least one electric motor is less than a static friction force between at least one substrate of the motor vehicle and a wheel of the motor vehicle, said wheel being arranged on the at least one substrate and steerable by means of the at least one steering lever.

12. The method according to claim 3, wherein the electric motor is actuated such that the actuating force of the at least one electric motor is less than a static friction force between at least one substrate of the motor vehicle and a wheel of the motor vehicle, said wheel being arranged on the at least one substrate and steerable by means of the at least one steering lever.

13. The method according to claim 4, wherein the electric motor is actuated such that the actuating force of the at least one electric motor is less than a static friction force between at least one substrate of the motor vehicle and a wheel of the motor vehicle, said wheel being arranged on the at least one substrate and steerable by means of the at least one steering lever.

14. A method for operating a steering system for a motor vehicle, wherein the steering system has at least one steering lever and at least one electric motor for shifting the at least one steering lever so as to cause a steering movement based on a steering input, the at least one electric motor is electrically connected to a current source via cabling, the method comprising:
   actuating the at least one electric motor; and
   measuring an electric current flowing between the current source and the at least one electric motor to check an electrical connection between the current source and the at least one electric motor, wherein the actuation of the at least one electric motor only occurs after the at least one steering lever was set by means of a locking mechanism.

15. A steering system for a motor vehicle comprising:
at least one steering lever; and
at least one electric motor configured to shift the at least one steering lever so as to cause a steering movement based on of a steering input, the at least one electric motor is electrically connected to a current source via cabling, wherein the steering system includes an electronic control unit configured to:
actuate the at least one electric motor,
measure a current flowing between the current source and the at least one electric motor to check an electrical connection between the current source and the at least one electric motor,
determine a position of the at least one steering lever during the actuation of the at least one electric motor, and
reduce an actuating force of the at least one electric motor after a change in the position of the at least one steering lever.

* * * * *